(12) United States Patent
Brunner et al.

(10) Patent No.: US 7,720,843 B2
(45) Date of Patent: May 18, 2010

(54) REAL-TIME END-USER AWARE INTERACTIVE SEARCH UTILIZING LAYERED APPROACH

(76) Inventors: Andrew Thomas Brunner, 905 Southshore Pkwy., Durham, NC (US) 27703; Josie Charleen Brunner, 905 Southshore Pkwy., Durham, NC (US) 27703

( * ) Notice: Subject to any disclaimer, the term of this patent is extended or adjusted under 35 U.S.C. 154(b) by 449 days.

(21) Appl. No.: 11/691,553

(22) Filed: Mar. 27, 2007

(65) Prior Publication Data

US 2008/0243776 A1    Oct. 2, 2008

(51) Int. Cl.
G06F 7/00 (2006.01)
G06F 17/30 (2006.01)

(52) U.S. Cl. ................ 707/722; 707/754
(58) Field of Classification Search ............ None
See application file for complete search history.

(56) References Cited

U.S. PATENT DOCUMENTS

| | | | |
|---|---|---|---|
| 2003/0110161 A1* | 6/2003 | Schneider | 707/3 |
| 2005/0021506 A1* | 1/2005 | Sauermann et al. | 707/3 |
| 2005/0216434 A1* | 9/2005 | Haveliwala et al. | 707/1 |
| 2006/0218115 A1* | 9/2006 | Goodman et al. | 707/1 |
| 2006/0253409 A1* | 11/2006 | Ronkainen et al. | 707/1 |
| 2007/0156677 A1* | 7/2007 | Szabo | 707/5 |
| 2007/0214131 A1* | 9/2007 | Cucerzan et al. | 707/5 |
| 2008/0071742 A1* | 3/2008 | Yang et al. | 707/3 |

* cited by examiner

*Primary Examiner*—Neveen Abel Jalil
*Assistant Examiner*—Isaac T. Jackson

(57) ABSTRACT

A system and method for facilitating real-time end-user awareness in results to a query to optimize and refine a computerized search utilizing an interactive result layer (IRL) and result operational layer (ROL) are disclosed. The present invention establishes a loopback feedback between encapsulated end-user interactions, which are facilitated through an interactive result layer (IRL), and the results from a query, passed through a result operational layer (ROL). An end-user selects interactions to particular results by way of a prompt within the IRL. The end-user interactions are provided to and processed in the ROL in real-time without the end-user having to re-query the system to reflect said interaction or combination of interactions. A real-time automatic result feeder aides in delivering new results to end-user when results are deleted. Subsequent queries can reflect past end-user interactions.

6 Claims, 12 Drawing Sheets

Fig. 7

| 902 QR₀ | 904 Previous Interactions | 906 ROL R₀ | 908 Interactions | 910 ROL R₁ | 912 Interaction | 914 ROL R₂ | 916 Interaction | 918 ROL R₃ |
|---|---|---|---|---|---|---|---|---|
| R1 | Delete R1 | R3 | | R3 | | R17 | | R17 |
| R2 | Delete R2 | R5 | | R5 | | R3 | | R3 |
| R3 | | R7 | | R7 | | R5 | | R5 |
| R4 | Delete R4 | R9 | | R9 | | R7 | | R7 |
| R5 | | R10 | | R10 | | R9 | | R9 |
| R6 | Delete R6 | R11 | Delete R11 | R14 | | R10 | | R10 |
| R7 | | R12 | Delete R12 | R16 | | R14 | | R14 |
| R8 | Delete R8 | R13 | Delete R13 | R17 | Move R17 to Position 1 | R16 | | R16 |
| R9 | | R14 | | R18 | | R18 | Save R18 to Folder A | R19 |
| R10 | | R15 | Delete R15 | R19 | | R19 | | R20 |

920 Note: End-User Display Holds 10 Results in View

Fig. 9

Headlines craigslist raleigh | for sale / wanted search for "fish tank"

55-150 gallon fish tank looking for fish aqu. with stand an filter will pay between 1- an 150.00 dollars for larger size im for real so only contact me if your forreal u can reach me at 252-793-4505 or 252 661-5366 ty

Moving Sale due to illness Everything must go.

This listing is for everything in household. Please call for information.

250 pieces of antique Mac-Beth Evans Pink Dogwood, 1929/1932. Corning Ware,Cremax The first pattern after buying out Mac-Beth Evans. Old wood table Using square nails for construction. With 4 new wood chairs. 180 gallon fish tank $800.00 Much.Much more. PLEASE CALL 919-284-4938

— 1102

Moving Sale Must move due to illness in family

This listing is for everything in house. Have cancer must sale out and move to drier climate. Depression glass Mac-Beth Evans Pir
pieces Some extremly rare. Corning Ware Cremax     Refresh
buying out Mac-Beth Evans. Antique Wood table    Reset
construction, Wuth 4 new wood chairs. 180 gallon           ed
$800.00, Boxes of household items. Bedroom sets    Rank Higher    d in
school House At Highway 42 & 581. China Cabinet
amps, speakers, Paid $11,000.00 will sale for $30    Rank Lower
with Tools Paid Total $32,000.00 will sale for $8,0
mechanic.

PLEASE PHONE for more Information-----919-284-4938

— 1104

— 1106

Selling Everything Due to illness

All household items, Partial list. 250 piece Depression Glass Mac-Beth Evans Dogwood Pattern,. Some items extremly rare. Corningware First pattern after merging with Mac-Beth Evans Cremax-Bordette Dishes. Snap-On Tool Box With tools. 180 gallon Fish Tank Never used $800.00.Antique Table Using Square nails at construction, With 4 new wood chairs, Bedroom sets,Antique oak Desk Used in SchoolHouse at Highway 42 and 581 in Wilson. High end Stero system Amps Speakers Cherry wood Used very little.Boxes of misc. Household items. Much Much More.

PLEASE CALL FOR INFORMATION ---919-284-4938

— 1108

All Inclusieve Deal One Of A Kind For A Great Price $4700

.......All Inclusieve Deal One Of A Kind For A Great Price.............

Fig. 11

Headlines

"Frame A Fish" fishtank $50

This fish tank is still available. I will have it at our garage sale on March 2nd. I am selling a fishtank that you hang on the wall. It looks like a picture frame. You can even blow up any picture for the background. The fishtank is fairly new. Everything you need is included. All you need to buy are some fish :)

Size:

Depth: 3"

Height: 20"

Width: 24 3/4"

— 1202

Moving Sale due to illness Everything must go.

This listing is for everything in household. Please call for information.

250 pieces of antique Mac-Beth Evans Pink Dogwood, 1929/1932. Corning Ware, Cremax The first pattern after buying out Mac-Beth Evans. Old wood table Using square nails for construction. With 4 new wood chairs. 180 gallon fish tank $800.00 Much. Much more. PLEASE CALL 919-284-4938

— 1204

Fish Tank - 55 Gallon $300

55 gallon fish tank with wood stand//gravel, pump, and water heater included. Everything for set up, but the fish. Size: 14 1/2 inches D / 55 inches Tall/ 51 1/2 wide. Cash Only If interested contact Ronda @ 919-850-9582

90 gallon fish tank Salt or fresh water $1000 all accesories included for salt water or fresh water fish. vho icecap transformer, lights blue and white flourescent bulbs, four total. sea life wet dry filtration, water purifier and chemicals, gravel , rocks and ornaments included. comes with tank, flip up canopy with lights, and base for filter and storage.   call chris olds 919-793-6895

AQUAPOD 12 gallon saltwater reef tank with STAND, already setup 6 m...

For someone wanting a small reef tank without the hassle of setting one up, I need a good place for this tank as travel with my job upon graduation will not allow me to maintain it. I spent around $600 on everything listed below. The tank has about 6 months of the original warranty left on it. Contact me directly at crsmith3@ncsu.edu if interested. Setup and description is as follows:

Fig. 12

REAL-TIME END-USER AWARE INTERACTIVE SEARCH UTILIZING LAYERED APPROACH

FIELD OF THE INVENTION

The present invention relates to optimizing and refining search results generated by computer systems, and more particularly to a system and method facilitating real-time end-user awareness in query results by employing a layer approach, loopback feedback, end-user interaction, and real-time automatic result feeder.

BACKGROUND OF THE INVENTION

"Search" technologies (also known as utilities, tools, or engines) have become increasingly important over the years as more data are stored and transferred through information systems. One of the most popular search technologies is related to search engines for Internet servers, which service millions of information seekers daily. Search systems are incorporated in many data organizational systems, including, but not limited to, those associated with Intranets, archiving, cataloging, directory content, and categorical listings, among others.

Presently, a typical search system prompts for a query from an end-user, processes the query, and then generates a result set from either a source or a number of sources being searched. The result set that is then transmitted to and displayed on a computing device represents a limited subset of the whole query result set. The end-user typically must view results from several "pages" of results or scroll down a more extensive, tedious listing of results. Consequent end-user interactions with particular results have been limited and do not reflect real-time end-user awareness.

As search systems increase in size and complexity, queries tend to generate more results than the typical information seeker can effectively go through to find the best or desired results. Currently, a search result set for any given query is based on systems and methods that elect data into the resulting output set. However, a typical returned result set for a query contains "noise", results that are not deemed relevant, significant, or content-laden by the end-user. There is a need to eliminate "noise" so information seekers (end-users) can effectively and efficiently go through search results.

Consequently, improvements for such systems and methods have focused primarily on index-based and/or query-based algorithms, functions, and organization, which influence how data are elected into the result set (i.e., size of result set), and/or data sorting operations, which influence the order of the results within a result set that has been returned to the end-user (i.e., weight or significance of particular result) that do not affect the size of the result set.

As for index-based approaches, these systems and methods, in recent years, have been manipulated by some entities to promote results that are typically not relevant, significant, or content-laden. For example, a classified search for "fish aquarium" may generate a result directed at a product completely unrelated to "fish" or "aquarium," such as "gambling," through malicious misrepresentation or false information. Other false entries may be attributed to data entry error. Some "search optimizing" technologies for website search engines take advantage of search algorithms that spider to find relevant content to create an index. These "optimizing" technologies distribute common keywords throughout a website or multiple websites to increase the chances of the search algorithm placing that website high in the result set, even though the website itself might not be content-laden. For example, some websites only contain more result sets rather than rich content pertaining to a subject matter in order to generate revenue associated with "pay-per-click" affiliations with popular Internet search engines.

As for query-based approaches, any particular query operation ends once an output result set has been given to the end-user. Some search systems contain methods that allow for a series of query prompts to refine search results thus producing a smaller subset from the previous result set; however, end-users are not able to perform operations on any particular result within the result set to exclude it from the given result set.

As for typical sorting operations, which allow the end-user some control to structure results, results are merely reorganized based on criteria pre-selected by the search system (such as "Most Recent") devoid of any particular end-user's evaluations, such as tags or ratings. The results are displayed based solely on given criteria independent of the end-user's other interactions. Current sorting operations function independently of other interactive operations. While current sorting operations may be dependent on an interaction between the end-user and the result set, it does not ensure that a plurality of interactions will impact the current result set and subsequent queries for a particular end-user. For example, "sort" just sorts results; "rate" just places a value on a result the end-user assigns. Currently, these operations and others similar to these do not work conjointly to affect what is returned to a particular end-user in real-time.

Current search systems have little to no end-user awareness. In other words, current technological approaches lead search systems to generate the same result set to similarly made queries regardless of the particular end-user. The end-user has limited capabilities to control the structure of results in a real-time environment, and end-user interactions do not work conjointly to structure results for the end-user.

Current systems that have attempted to personalize the search environment to the end-user allow the end-user to store selected results on a computing device(s) and/or database(s). However, these search systems lack the awareness of the end-user's preferences and return redundant results to the end-user in subsequent queries. For example, in a search for a "house," an end-user may save house listings they prefer. Subsequent searches may yield houses already "saved" by the end-user and overburden the said end-user who must peruse results that have been re-included and already processed by the said end-user. Current "save" operations do not loopback feedback to search operations. Rather, these operations only "recall" items. Furthermore, most search systems do not take into account a result the end-user wishes to eliminate in subsequent queries.

"Tagging" operations in current search systems, such as the system employed by Amazon.com of Seattle, Wash., work in a similar fashion to "saving" results. End-users may "tag" (categorize) an item using keywords and then proceed to search for items that have been tagged with similar keywords. An end-user may query a "tag" to find results personally tagged by said end-user or results "publicly" tagged by other end-users. These "tags" simply recall items associated with a keyword or keywords. In a "public" tag query, the end-user has little control over the result structure of a result set returned. If an end-user disagrees with a "tag," he is not able to change the tag or that particular result from being re-returned to him in a similar query. Results returned to a "personal" tag query may be those assigned by the particular end-user; however, those results will not reflect other similarly tagged results from other end-users, thus the end-user does not gain the benefit from "social tagging". The results to a "tag" query, similar to the "save" query, will only output a result that has been "tagged" (public and/or private) and will not incorporate new results unless they have been "tagged" as well from a previous query (usually from the main query system.) Amazon.com "tag" system employs a separate search system for "tagged" items, distinct from the main Amazon.com query system. End-users are prompted to search "Amazon.com" OR "Products Tagged With". The feedback of end-user interactions through "tags" are not truly loop backed into the original search system. In other words, tag queries only work within a "tag" search, and the primary query system is generally unaware of results "tagged" by the end-user. Current "tagging" technologies do not work in concert with other end-user interactions to produce end-user awareness.

Current search systems that allow limited access to end-users to feedback information into the system (such as a prompt for end-user's rating of an item), do not allow such interaction to affect the results for the particular end-user. The given rating through various algorithms may affect the sorting and/or ranking of subsequent results based on those ratings; however, subsequent result sets for a particular end-user do not directly take into account the end-user's rating for the given result. For example, a particular end-user may rate an item as being very low in a given rating scale, while the majority of users have rated the item very high. That particular result for that item may appear highly ranked in subsequent result sets for the said end-user despite the said end-user's low evaluation for the result containing that particular item. Any end-user interaction currently affects search systems as a whole and produce similar results regardless of end-user.

Current rating operations that are tailored only to an end-user, such as the rating operation for RSS items in a query search for Newsgator.com of Denver, Colo., only highlight the number of stars an end-user designates. The end-user cannot proceed to change the rank of items. In other words, the result order cannot be changed or manipulated by the end-user in real-time nor is the interaction able to work in conjunction with other end-user interactions. Each item retains its order in the result set as it was originally returned. It is interesting to note that although Newsgator.com has the capability to delete items from general RSS streams (although this function is not present in the RSS query system), the deletion is not displayed in real-time. In other words, the page must be reloaded to reflect deletions.

Accordingly, there is a need for improved and more efficient search methods that facilitate end-user awareness, allowing end-users to structure results on particular preferences in regard to weight, significance, relevance, and/or other criteria to aid current and/or subsequent query results. Similarly, there is a need for a real-time system that allows a plurality of end-user interactions to be performed concurrently to achieve the best desired results for the particular end-user.

SUMMARY OF THE INVENTION

The present invention provides methods to solve the problems of present search systems associated with "noise" in the result set by establishing a loopback feedback between end-user interactivity by way of an interactive result layer (IRL) and the results from a query, passed through a result operational layer (ROL). Thus, the end-user is provided means to process results in an end-user aware system that can reduce the size of a result set by eliminating results of little importance to said end-user, grant more control to said end-user to structure said results, and, in general, provide a more meaningful, effective, and efficient way to utilize results from a search all in real-time. A real-time automatic result feeder ensures the flow of results to the end-user is fluid, fast, and automatic. As results are deleted or needed, the automatic result feeder provides more results to the ROL, which are then provided to the IRL to be displayed in real-time.

The present invention is "aware" of end-user interactions (present and/or past) and can incorporate a plurality of said interactions that currently work independently of one another. Through a "layer" approach, the present invention is able to provide results geared around a particular end-user that seamlessly integrates end-user interactions on the results themselves without changing the integrity of the original result for other end-users. The present invention works well in a persistent query environment as well. Other benefits will be made apparent in the detailed description of the present invention.

In accordance with the present invention, a system and method are provided where results to a query (herein called "query results") are fed through an automatic result feeder that controls the amount of results fed as input to the result operational layer (ROL) where output, ROL results, are passed to an interactive result layer (IRL) where said ROL results are organized as a plurality of responses to said query along with one or more prompts where an end-user is able to select an interactive operation, which is assigned as an identified interactive operation, and any data to facilitate said operation to a particular ROL result to be performed by methods described herein. ROL results displayed to a particular end-user are based on the application of interactions (interactive operations) made by said end-user, herein called "end-user interactions." Encapsulation of said end-user interactions is accomplished by data assignments made by the IRL to said end-user interactions, herein called "end-user data". The end-user data are looped back from the IRL to the ROL for the actual corresponding operations to the end-user interactions to take place. The ROL results and end-user data are provided to the IRL in real-time. This invention utilizes said end-user interactions, said end-user data, said IRL, said ROL, and said loopback feedback to facilitate said ROL results to become end-user aware in a real-time environment.

The present invention is embodied in a computing device or computing devices networked together, such as an Internet or Intranet system. The embodiment of the present invention includes, by way of example only, servers, desktop computers, laptop computers, personal digital assistants (PDAs), mobile devices, and/or the combination of one or more of said devices.

In accordance with an aspect of the present invention, all results as input to the present invention are organized as a plurality of individual data structures where each said data structure represents a single result and attributes thereof. A computer implemented method can be employed to convert input as to ensure accordance with the present invention, such as creating a plurality of data structures, parsing results, and assigning values to said data structures.

In accordance with an aspect of the present invention, there is provided an automatic result feeder that controls the flow of results that are provided to the ROL in a real-time environment. The automatic result feeder provides the plurality of responses to a query to the ROL in real-time automatically when end-user interactions lead to omission of a result or results in the display or the display has a deficient number of results. The number of results to be displayed can either be chosen by the end-user or pre-determined in various embodiments of the present invention. The automatic result feeder resides in a preferred embodiment between the query results and the ROL.

In accordance with an aspect of the present invention, there is provided means to identify each end-user. For example, in a preferred web client/server embodiment, said identity can be established by way of a login, or JavaScript and cookies, or any other means that facilitates the establishment of uniqueness within the present invention. In a Jabber application client/server embodiment, said identity could be a Jabber ID (JID).

In accordance with an aspect of the present invention, there is provided a computer implemented method of providing an interactive result layer (IRL) that comprises a prompt or prompts with graphical representations of available operations (end-user commands) corresponding to said operations that affect the structure of the display of results in real-time. Exemplary real-time changes in structure of a particular result within the plurality of results are modifications to the size, position, visibility or any other attribute thereof, that when modified causes a result to be noticeably affected by said modification as a result of an end-user interaction in real-time. Examples of said end-user commands that affect the structure of the display of results may include, but are not limited to, ranking, deleting, and moving results to a folder. Ranking changes the position of a result within the display (first item, second item, etc.) Deleting causes a result to be removed from the display. Moving a result to a folder could change the display if the moved result is no longer visible in area it was displayed and/or the "moved" item no longer appears in subsequent searches. Examples of said end-user commands that do not strictly affect structure include rating, adding commentary (notes), and/or tagging (categorizing). However, when combined with other commands, the aforementioned examples may affect the structure of the display, such as "sort by" end-user ratings, where the display is directly affected by the end-user interaction of rating. The present invention further includes methods to perform said operations and/or said combinations to facilitate end-user awareness.

In accordance with an aspect of the present invention, there is provided a computer implemented method of providing an interactive result layer (IRL) that includes displaying end-user interactions in real-time and displaying ROL results that reflect said interactions.

In accordance with the present invention, there is also provided a computer implemented method of providing a result operational layer (ROL) that comprises the operations necessary to perform said operations to facilitate end-user interactions on results.

In accordance with an aspect of the present invention, there is further included a computer implemented method to store end-user data (EUD) in a user store. The user store includes the end-user data necessary to perform operations on results, identify particular end-users, and identify particular end-user interactions to said results by particular said end-user for current, persistent, and/or subsequent queries.

In accordance with an aspect of the present invention, there is further included a computer implemented method to store ROL result data in a result store. The result store includes data relating to the said results necessary to identify particular said results, to associate said result with particular end-user interaction or plurality of interactions, and to perform operation or plurality of operations to facilitate said end-user interaction or said plurality of interactions in a way such that said result data can be utilized for current, persistent, and/or subsequent queries.

In accordance with the present invention, there is also provided a computer implemented method of a real-time loopback feedback that includes end-user data being provided from the ROL to IRL and from IRL to ROL in real-time. In other words, end-user data provisioning is facilitated in real-time between the two layers.

A preferred client/server embodiment of the present invention is a combination of one or more computer servers and a remote client device or devices for a single end-user or a plurality of end-users that utilize methods described herein where the IRL resides on the client and the ROL resides on the server or a cluster of servers. However, the ROL may optionally reside in part or in whole on the client. The automatic result feeder resides on the server in a preferred embodiment and has access to the result store and user store. The result store may reside in whole on the client or on the server(s), or it may reside in part in some combination of the client and server(s). The user store may reside in whole on the client or on the server(s), or it may reside in part in some combination of the client and server(s).

A preferred client-only embodiment of this invention is a computing device providing an automatic result feeder, IRL, ROL, user store, and result store to facilitate real-time end-user based awareness by methods described herein. Depending on the method used to ensure uniqueness for data utilized in this embodiment, the user store and result store may be superimposed on one another, meaning one store serves both functions of a user store and result store.

In an embodiment of the present invention, methods described herein may be embedded in part or in whole in other systems to facilitate real-time end-user based awareness. For example, a result generator can contain a result operational layer (ROL). Also, the real-time automatic result feeder can also perform some functions of the ROL, such as assignments. Another example is part of a user store may be an end-user profile stored in another database.

Other aspects and features of the present invention will become apparent to those of ordinary skill in the art upon review of the following description of specific embodiments of the invention in conjunction with the accompanying figures.

BRIEF DESCRIPTION OF THE DRAWINGS

These illustrative examples of embodiments, figures, and other objects of the present invention will become apparent upon further consideration of the following detailed description of the invention when read in conjunction with the drawing figures in which:

FIG. 7 illustrates an exemplary IRL prompt from FIG. 6;

FIG. 9 is a table depicting a simulation of iterations of ROL results through the present invention with various exemplary end-user interactions;

FIG. 11 is screenshot of an exemplary client-only embodiment of the present invention depicting the same query presented in FIG. 10; and FIG. 12 is screenshot of an exemplary client-only embodiment of FIG. 11 depicting completed interactions.

DETAILED DESCRIPTION

A preferred client/server embodiment of the present invention operates in a computing environment, comprising: an end-user, individual computing device interconnected over a network such as the Internet, a result generator located on a server or servers responding to at least one query made by said end-user and generating query results, a real-time automatic result feeder controlling the flow of results to the ROL, a Result Operational Layer (ROL) operating on results and outputting ROL results and end-user data, User Store, Result Store, an Interactive Result Layer (IRL) facilitating end-user interactions with said ROL results, and loopback feedback from IRL to ROL. However, there can be a client-only embodiment of the present invention where the real-time automatic result feeder, ROL, IRL, user store and result store reside on a single computing device receiving results to a query.

Figure 1:
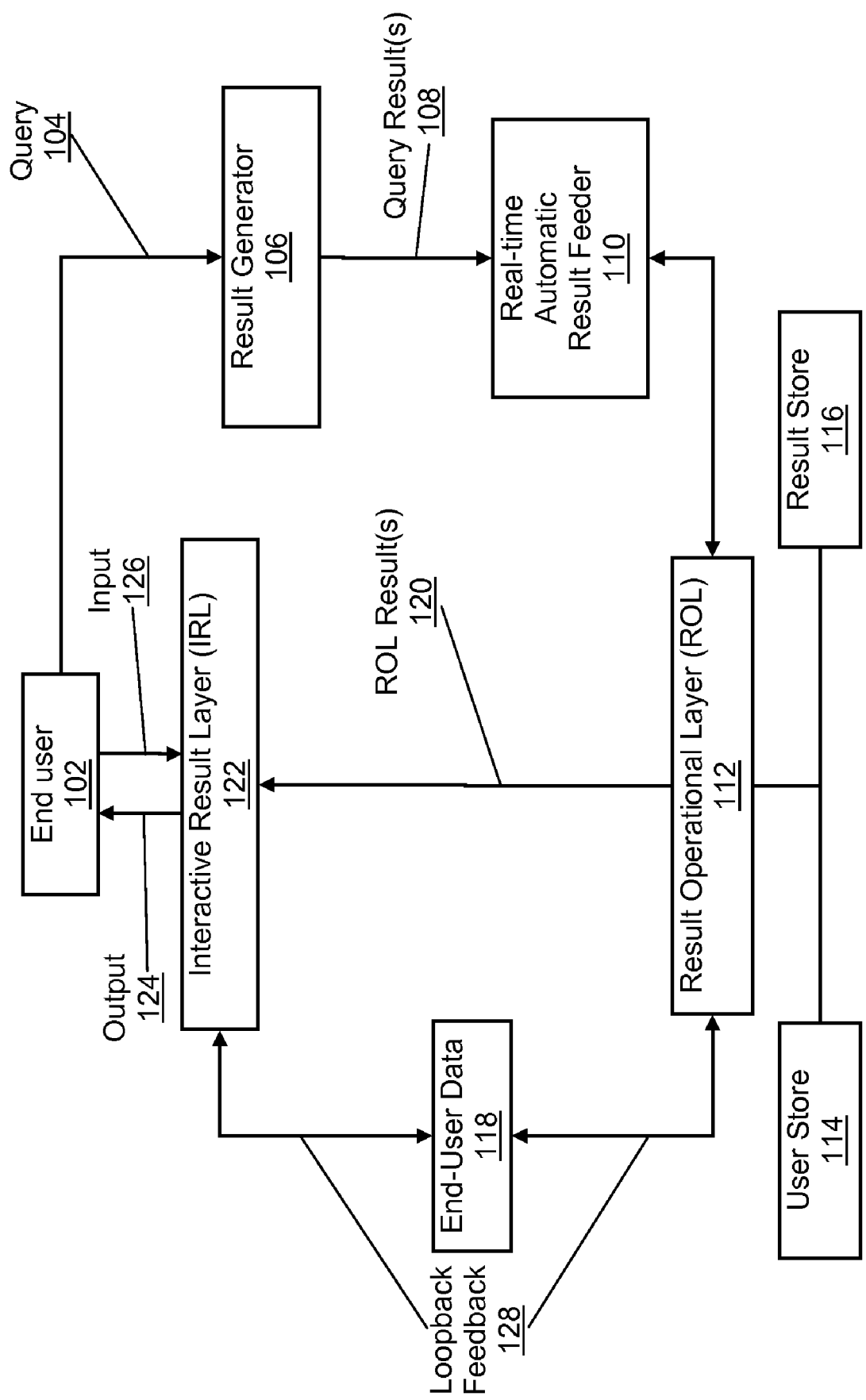
FIG. 1 is a flow diagram of the present invention in an exemplary embodiment.

FIG. 1 is a flow diagram of the present invention in an exemplary embodiment. An end-user (102) enters a query (104) to a search system (called result generator 106). The result generator (106) represents current systems and methods used to respond to and generate results to a query (104). The query results (108) are applied to the present invention, starting with the real-time automatic result feeder (110) where results are organized as a plurality of responses to a query and a specified number of results are provided to the result operational layer (ROL) (112) where each result is identified to facilitate said result being associated with an interactive operation and where command operations are performed to reflect a particular end-user's interactions with said result. The ROL output is herein called ROL results (120). The ROL (112) utilizes data regarding results retrieved from the result store (116) and data regarding a particular end-user and said end-user's interactions retrieved from the user store (114) to perform said operations and produce said ROL results (120). The use of "result store" and "user store" are terms used solely to describe purpose of storage; however, in some embodiments of the present invention, the stores may be a single, unified "store" or, in other embodiments, multiple, distinct stores. ROL results (120) are provided to the interactive result layer (IRL) (122), which outputs (124) the ROL results (120) to be displayed to an end-user along with a prompt or prompts with an array of interactive operations that a particular embodiment of the present invention facilitates. The end-user may select said operations to be performed on particular said ROL results through the prompt, which is input (126) to the present invention. Operations selected (126) and any assignments for said output ROL results (124) are encapsulated in end-user data (118) by way of the IRL (122) that associates end-user interactions (interactive operations) with corresponding results. In the present invention, end-user data (118) encapsulates data assignments and associations of commands necessary to perform operations in methods described herein, as well as any other data pertaining to a particular end-user that might be utilized in said operations. In a preferred embodiment, the displayed results are structured in a way that reflects end-user interactions in real-time. In other words, the IRL (122) changes the display to the end-user in real-time that reflects said end-user interactions. For example, the IRL can delete a particular result through the use of JavaScript by removing a DIV element in an html document in a web client/server embodiment. A loopback feedback (128) occurs whereby end-user data (118) are sent to the ROL (112) where said operations to ROL results (120) are performed and said end-user data are saved to the user store (114). If any operations omit a result or results from the display, then the automatic result feeder (110) provides additional results to the ROL (112), which outputs ROL results (120) to the IRL (122) to be displayed to the end-user (102) in real-time. Data provisioning between the IRL (122), ROL (120) and automatic result feeder (112) occur instantly or near instantly. Some time lapse may occur due to network or CPU utilization issues; however, the processes in themselves occur without requiring further input by said end-user. End-user data provided by the ROL are used to ensure results are structured in accordance with past end-user interactions by way of the IRL. That is to say the IRL provides means for the structure of ROL results to be displayed by utilizing end-user data. For example, when the IRL is provided end-user data for a particular result with the operation identifier "rank" with a "position" attribute set to one, the IRL would position said result at the top of results in the display. End-user data (118) are stored by way of the ROL (112) in a user store (114), and the result data are stored by way of the ROL in a result store (116) to be utilized in current and/or subsequent queries performed by said end-user.

Figure 2:
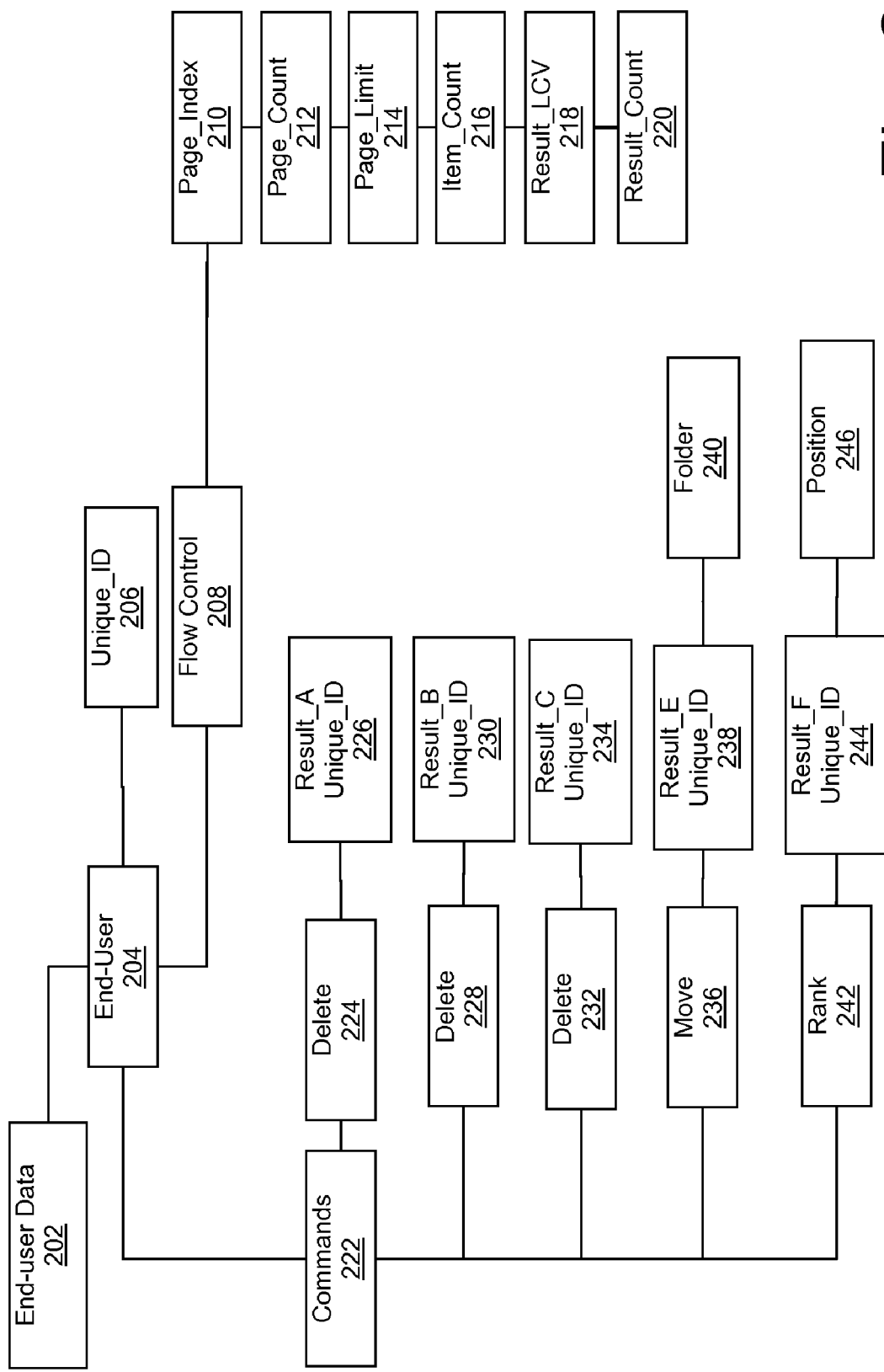
FIG. 2 is an illustration depicting exemplary end-user data encapsulating interactions of a particular identified end-user and automatic result feeder attributes.

FIG. 2 is an illustration depicting exemplary end-user data (202) encapsulating five (5) interactions of a particular end-user (204) and flow control (208) attributes to provide to the automatic result feeder to facilitate operations in the present invention. FIG. 2 further demonstrates an exemplary embodiment to encapsulate "uniqueness" of said end-user (206), ROL results (226, 230, 234, 238, 244), and said end-user interactions (224, 228, 232, 236, 242) with said ROL results in the present invention. End-user data (202) are utilized by the ROL to perform the actual operations selected by said end-user by way of the IRL. The interactive operations facilitated by a particular embodiment of the present invention have corresponding operation identifiers (herein called "end-user commands" for this particular exemplary embodiment), which identify the particular interactive operation. End-user data comprises of end-user commands and any attribute assigned by said end-user to said data for the particular, identified ROL result. The interactive operations necessary to be included in the present invention must affect the structure of how the results are organized and/or displayed to the end-user to demonstrate the real-time end-user awareness of the system. For example, a "delete" command could trigger a result to be removed from the display and move the results below said result up correspondingly. "Uniqueness" must be established in the present invention to ensure that the correct operation is performed for the particular end-user for a particular result. The "Unique_ID" attribute (206) establishes "uniqueness" in this exemplary embodiment for a particular end-user and is contained within the end-user data structure attribute (204) for said end-user. "Unique_ID" 206 is the established "identity" of the end-user and is used to associate said end-user with end-user commands (224, 228, 232, 236, 242) and said identified ROL results (226, 230, 234, 238, 244) for which said interactions are directed. Furthermore, the identity of each said ROL result (226, 230, 234, 238, 244) associated by the IRL is also used to link said end-user to said end-user command and said results. The IRL encapsulates operations by said end-user along with an identifier of each result that is the target of each operation in said operations. Exemplary operations are included in a list of end-user commands (222) and each command in the list is assigned the identity of associated with unique identifiers of ROL results (226, 230, 234, 238, 244) and identifiers of corresponding interaction (224, 228, 232, 236, 242) performed by said end-user. Delete command 224 represents the end-user command to "delete." The unique identifier for "Result_A" is assigned to the "Unique_ID" attribute (226) of said command and thereby associates the "delete" command to "Result_A" for end-user 204. The delete command 228 represents the end-user command to "delete" as well and has the same value as 224 and 232. Said end-user command identifies which operation will be performed in the ROL. The unique identifier for "Result_B" (230) is assigned to a "Unique_ID" attribute of 228 to associate the "delete" command with "Result_B". Delete command 232 has an assigned unique identifier 234 equal to the value the identifier of "Result_C". Attributes are also placeholders for data assignments for a particular end-user command. For example, move command 236 has an assigned unique identifier 238 and an attribute of "folder" (240) providing capacity to hold the assignment for which folder the end-user elects to move said "Result_E". Rank command 242 has an assigned unique identifier 244 to the value of the identity of "Result_F" and an attribute of "position" (246) assigned to the value of the position in the list of results the end-user elected to rank "Result_F" in a list of results. Attributes can contain more complex data as well, such as text, rich text (HTML, RTF, etc.), etc., associated to a result by and input by an end-user. "Unique_ID" 226, 230, 234, 238 and 244 each have a different value corresponding to the different results with which each command is associated. The importance of establishing "uniqueness" for end-user interactions and how it is utilized will be made apparent in the description of FIG. 5.

In a preferred embodiment, when a result generator responds to a query by an end-user, the plurality of responses to said query are provided to the automatic result feeder. FIG. 2 further depicts exemplary data structure for "flow control" 208 associated with end-user 204 that are utilized by an automatic result feeder for the present invention. The automatic result feeder in the present invention utilizes specifications to the number of results to output (216) and the loop control variable (LCV) 218 to throttle the amount of results fed as input to the ROL. The total number of responses in the complete plurality of responses to a query provided by a result generator is assigned in attribute 220 by the automatic result feeder. The "Result_LCV" (218) attribute is a loop control variable (LCV) that facilitates the automatic result feeder to iterate through all results provided by a result generator and serves as a placeholder for which query result is in iteration in the present invention. The LCV is a variable that changes with each iteration of results within the automatic result feeder. For example, in a particular embodiment of the present invention, the initial result would have a LCV attribute (218) of "0" for a "zero-based" array. The next result in iteration would have a LCV attribute (218) of "1", and so on, until all available results have been exhausted. In other words, the result count (220) is reached, and there are no more results to be iterated. Attribute "Item_Count" (216) provides the automatic result feeder with the number of results to provide to the ROL and can vary each time depending on multiple factors, such number of results omitted during end-user interactions. End-user data (216, 218, 220) during a loopback feedback would provide the ROL and automatic result feeder the ability to continue iterating query results and feed a specified amount of query results to the ROL, further explained in FIG. 3. In an exemplary embodiment that allows end-users to "page" through results, additional data can be utilized to facilitate placement of results on pages. Page attributes can include "page index" 210, "page count" 212 and "page limit" (number of results per page) 214. 210, 212, and 214 are informational indicators on how results should be displayed to the end-user, and therefore, how many results are required by the ROL. In some embodiments of the present invention, the end-user may assign values to certain flow control variables, such as "page limit" 214; however, other embodiments may have these variables predetermined. Flow control 208 data, in a preferred embodiment, are utilized for the current query session and need not be saved for subsequent queries since sizes of result sets may change with additions and deletion to databases the search takes place.

Figure 3:
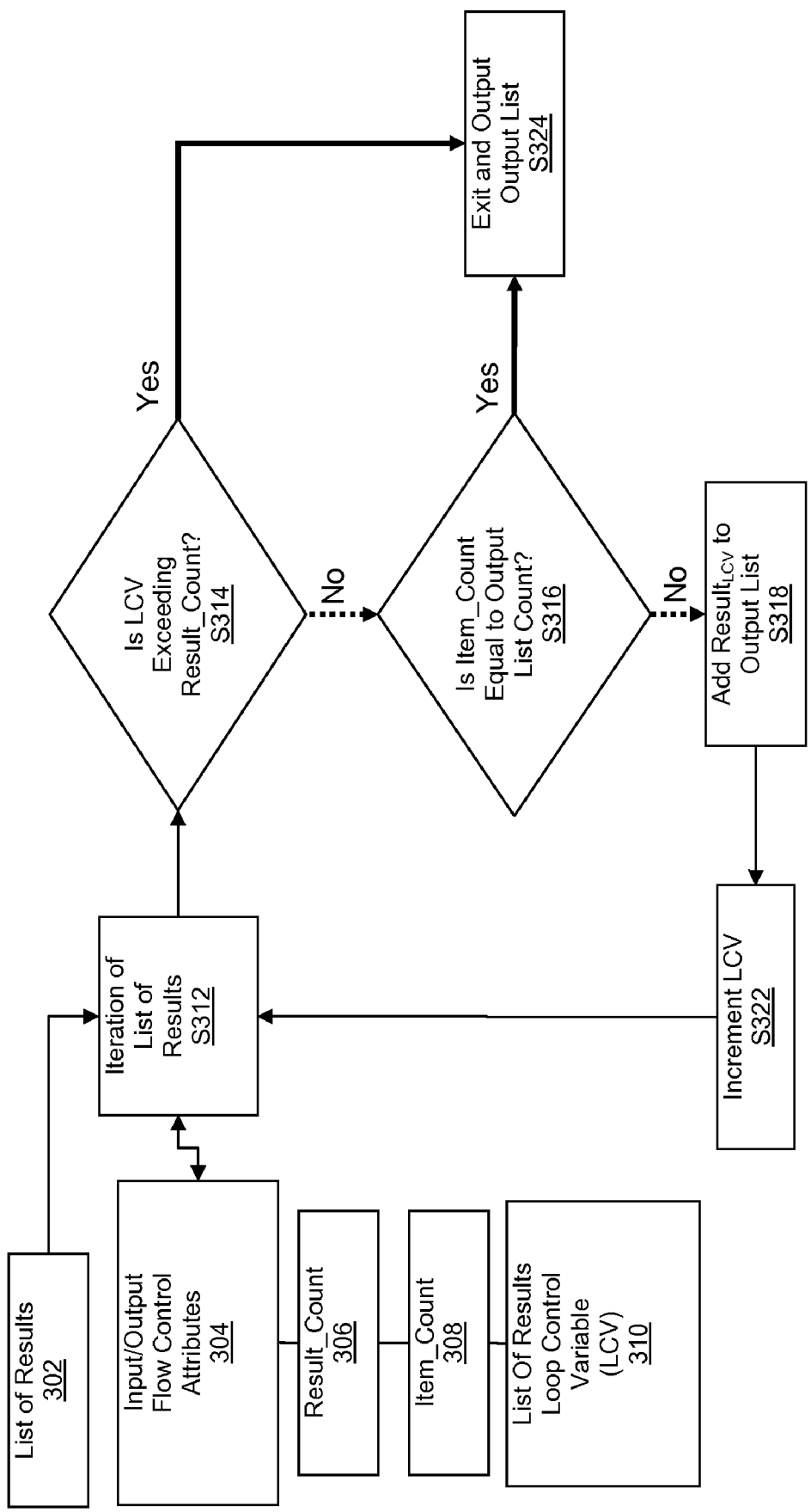
FIG. 3 illustrates an exemplary embodiment of the logic and steps of the real-time automatic result feeder from FIG. 1 of the present invention.

FIG. 3 illustrates the logic and steps of the iteration of query results in the automatic result feeder in an exemplary embodiment of the present invention. Results to a query can extend into the hundreds and thousands, and most information seekers typically will not be able to view all said results. The automatic result feeder controls the flow of results that are ultimately displayed to the end-user. Not only does it subset a result set to a query, it also provides in real-time additional results ultimately to the IRL during loopback feedback operations when ROL results are being removed from the display. The responses to a query are organized as a plurality of results. In the exemplary embodiment depicted in FIG. 3, the plurality is represented as a "list" 302. The entire list of results 302 for a particular query is provided to the automatic result feeder. Also, provided are the "input/output flow control attributes" 304. "Result count" 306 is determined by the number of total responses returned to a particular query. "Item count" 308 represents the number of results to be output from the automatic result feeder. Depending on the particular embodiment, many different methods exist to determine variable 308. 308 changes in real-time to reflect end-user interactions. In an exemplary embodiment, if said end-user is viewing ten (10) results at a time and has elected to delete two results (2), then 308 would be "2". If said end-user subsequently deletes one more result, then 308 would be "1". The list of results loop control variable (LCV) (310) is the index of the current result in iteration.

Step S312 is the iteration of the list of results (302) from a query. The results are systematically added as output of the automatic result feeder, herein called "output list". If the "Result_Count" attribute 306 is unassigned, as is the case when the results are first provided to the present invention, the automatic result feeder would assign the value of the total count of results provided to the automatic result feeder. 308 determines the number of results to be added to the output list. For example, if ten (10) results are to be viewed, then 308 would equal "10," and S312 would iterate up to ten (10) results. (If fewer than ten (10) results are in the list 302, all results would be iterated.) As each result is iterated, 310 is incremented to reflect the number of iterations and is the index of the particular result in iteration in the list of results (302). The next step S314 is an evaluation to determine if the loop control variable 310 is incremented past the point in which results exist. In other words, if LCV 310 is out of bounds of the list, then the output list is provided to the ROL S324 and the automatic result feeder method is exited. If LCV does not exceed the list, step S316 determine if the number of results in the output list is equal to the number of results requested by the "Item_Count" attribute (308). If the number of results added to the output list matches that of the attribute 308, then the ROL is provided the output list in step S324, and the automatic result feeder method is exited. If the number of results added to the output list does not equal 308, then step S318 adds the result in iteration, "Result$_{LCV}$," to the output list. The LCV attribute (310) is incremented in S322, and the iteration process continues until the automatic result feeder method exists. The output step S324 provides all results in the output list (added in S318) to the ROL and then exits. During a loopback feedback, end-user data would contain the automatic result feeder attributes 304. 308 can be changed in either the ROL or IRL to reflect end-user interactions. Said data would be provided to the automatic result feeder. If 308 equals or is greater than "1" in this embodiment, then additional results would be iterated. In an embodiment where results are not inherently identified, user store and result store access would be preferred in the automatic result feeder such that results with associated interactions can be provided to the ROL first as to ensure efficient end-user "awareness" in the present invention. In other words, the automatic result feeder could organize all results that are associated with interactions (in result and/or user store) and feed those results first. In this case, a more efficient embodiment of the present invention would allow the automatic result feeder to contain some functionality of the ROL to establish result identity.

Figure 4:
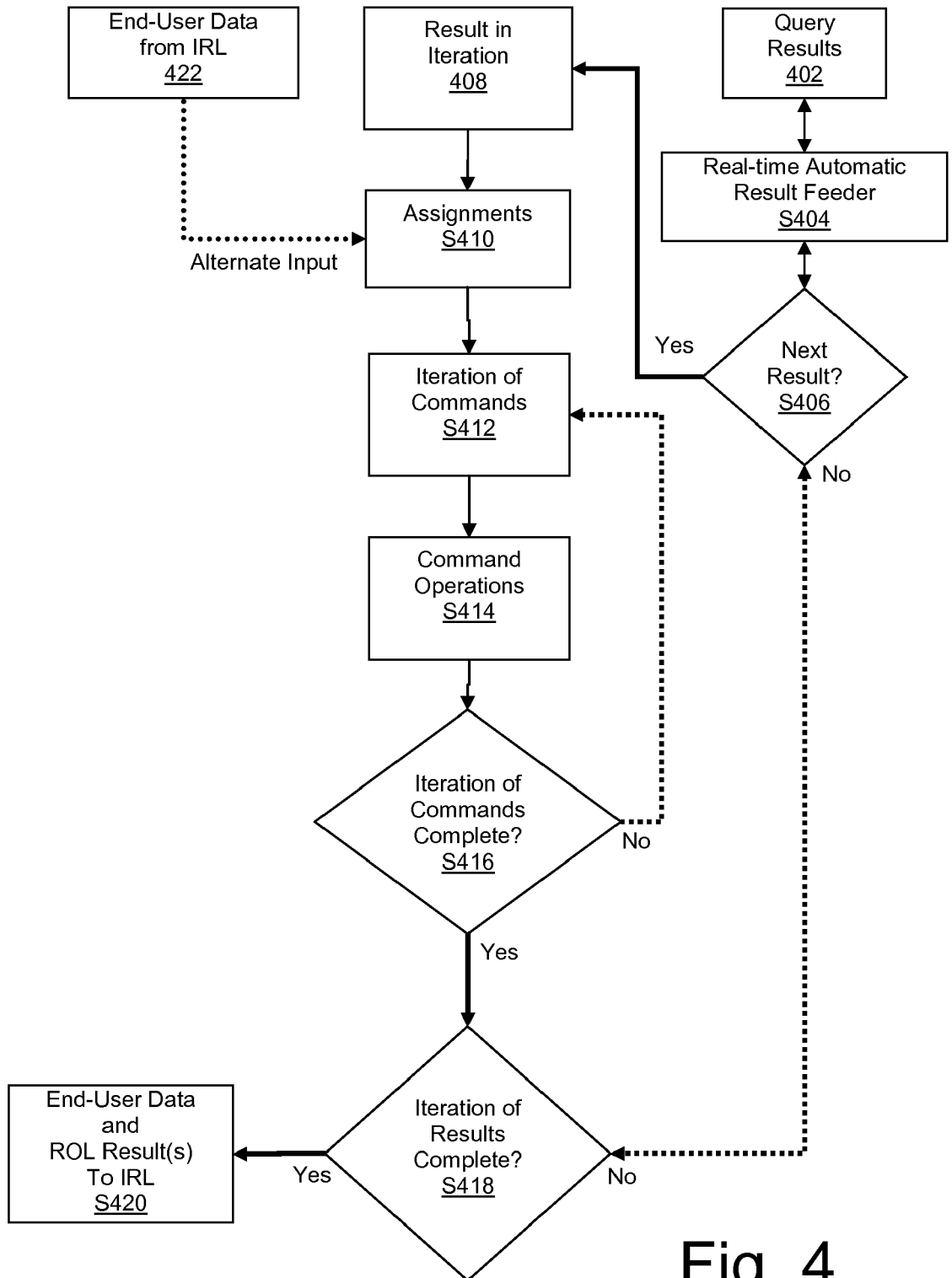
FIG. 4 illustrates an exemplary embodiment of the logic and steps of the iteration of results in the Result Operational Layer (ROL) from FIG. 1 of the present invention.

FIG. 4 illustrates the logic and steps of the iteration of results in the ROL in an exemplary embodiment of the present invention where the ROL is not inherent in the result generator. In other words, results output by the result generator do not provide the present invention identity for each result. Therefore, this exemplary embodiment assigns "uniqueness" to each result that is a response to a query. However, other exemplary embodiments of the present invention can include a unique identifier already assigned to all items that are provided to the present invention or a unique identifier assigned only to results in which an interaction by an end-user takes or has taken place.

Depicted in FIG. 4 are two sources of inputs to the ROL: query results (402), which are results provided by the automatic result feeder and end-user data (422) from the IRL, which include data encapsulating a particular end-user's interactions for particular results. The ROL depends on "uniqueness" of each result to ensure each end-user interaction is properly associated with its corresponding result for which the interaction is directed. The format of input to the ROL is assumed to be known by the ROL and is organized as a plurality of results in the present invention. If the format is unknown by the ROL or is not structured appropriately, then each result in the result set would need to be parsed (or converted) and assigned to a plurality of data structures that represent said result to be accessible by the ROL. Step S404 controls the number of ROL results provided to the IRL for a particular end-user. S404 is particularly useful for an enormous result set, which can be broken down into smaller, more manageable subsets. In a preferred embodiment, the quantity of results output to the display by way of the IRL is determined by end-user interactions. End-user data provided from the IRL contain attributes that facilitate the control of number of results output. For example, the said end-user could elect to view 25 results on his display for a query that returns 30,000 results, and as each result is deleted, more results would be presented by way of the present invention in real-time. However, auto-feeding (results fed automatically through automatic result feeder) is determined by a particular embodiment, and the means for the determination of the particular number of results outputted can vary.

408 is a result in iteration from a subset of results (402, S404 and S406). In an embodiment, a subset can include the whole set. Step S410 determines the identity of the result in iteration (408), the identity of the end-user, and retrieves any commands associated with said identified result and said identified end-user. Each command is represented in a plurality of commands in end-user data. In this example embodiment, the "plurality" is referred to as a "list", but can include arrays or other structures or objects that constitute a plurality. If the result is "new" to the system, it will be assigned an identifier for the purpose of establishing "uniqueness" to said result. If said result has passed through the ROL before, in the present embodiment, the identity of said result will be retrieved from the result store utilizing attributes of said result 408. The identity of said end-user and the identity of said result are used to retrieve any past end-user commands made by said end-user for said result from user store for step S410. Each end-user command and attributes thereof are placed in a data structure that is organized as a plurality of structures (list of commands) to be iterated in S412.

Step S414 is an iteration of commands for said result 408 where each command in the list of end-user commands is associated with the actual operation to perform said command. For any "new" result to the system, no previous interactions can be retrieved for the said end-user, and therefore, no end-user commands will be performed by the ROL during S414. However, in an embodiment of the present invention, other operations to the result from other "layers" may be performed during this step. For a result with commands in the list of commands in the end-user data structure, the operation to carry out the command is done in step S414 to reflect said end-user's interactions. For example, a command with an identifier "delete" would result in the particular result in iteration to be deleted from the ROL results. An evaluation is carried out in step S416 to determine if the iteration of commands for the particular result 408 is complete. If more commands are assigned to said result, then said result loops to S412. If a command to be performed causes the omission of the result in the display, such as "delete", then no other operations need take place, and the iteration of commands is deemed complete (S416). The iteration of commands is complete (S416) when all commands are processed (the exception is for the case of "omission"). Then, the ROL determines whether the iteration of results is complete (S418). In particular embodiments of the present invention, methods are included to determine what commands require "omission" from the display, and therefore require a replacement result for the display. If any commands performed in S414 cause an "omission", then the iteration of results would not be complete in a preferred embodiment, and S406 would determine another result is needed from the automatic result feeder. S404, end-user data are provided to the automatic result feeder for another result to be returned. Feedback from the automatic result feeder (S404) is needed to determine if the iteration of results is complete. If all results have been exhausted or the "item count" (number of results to be returned) has been reached, then ROL results and end-user data are provided to the IRL (S420). If no, then the next result is retrieved (S406) for iteration from the subset of query results (402). The ROL could continue to iterate until all said results pass through the system. However, in another embodiment of the present invention, the result can be sent to the IRL once the iteration of commands is complete (S416) rather than the iteration of the results is complete (S418).

ROL results are used by the IRL to create end-user data, which include the encapsulation of end-user interactions to particular ROL results by a particular end-user. End-user data (422) are provided to the ROL from the IRL to update the user store during step S410 and to process the end-user data for the ROL result or results during steps S412 and S414. Updating the user store involves storing the interaction or plurality of interactions encapsulated by end-user data (422) provided by IRL to the ROL by way of loopback feedback. End-user data include assignments made by the IRL along with data input by end-user and the end-user data previously provided to the IRL by the ROL. The IRL already made the assignments for each command in the list of end-user commands necessary for the ROL to identify said commands, and, as such, said end-user data are utilized by both the IRL and ROL to facilitate end-user awareness in the present invention.

The ROL iterates through the list of commands (S412), using the operation identifiers assigned in end-user data (422) to associate said operation identifiers to the methods necessary to execute the actual operations. Said operations (S414) are executed whereby the identified operation for the particular result will be performed. IRL also employs methods to ensure said operation is a structural change on the display. Since the present invention iterates through the plurality of commands, end-user interactions may work in concert with other end-user interactions. For example, "sort by end-user ratings" is accomplished by the present invention associating all previous "ratings" by end-user to the particular results in which they were assigned, and then "sorting" all said results by the assigned attribute of "rating". Once the iteration of commands is complete (S418), the ROL result or results along with end-user data, are fed back to the IRL (S420) without another query having to be issued by the end-user to reflect said end-user interactions.

Figure 5:
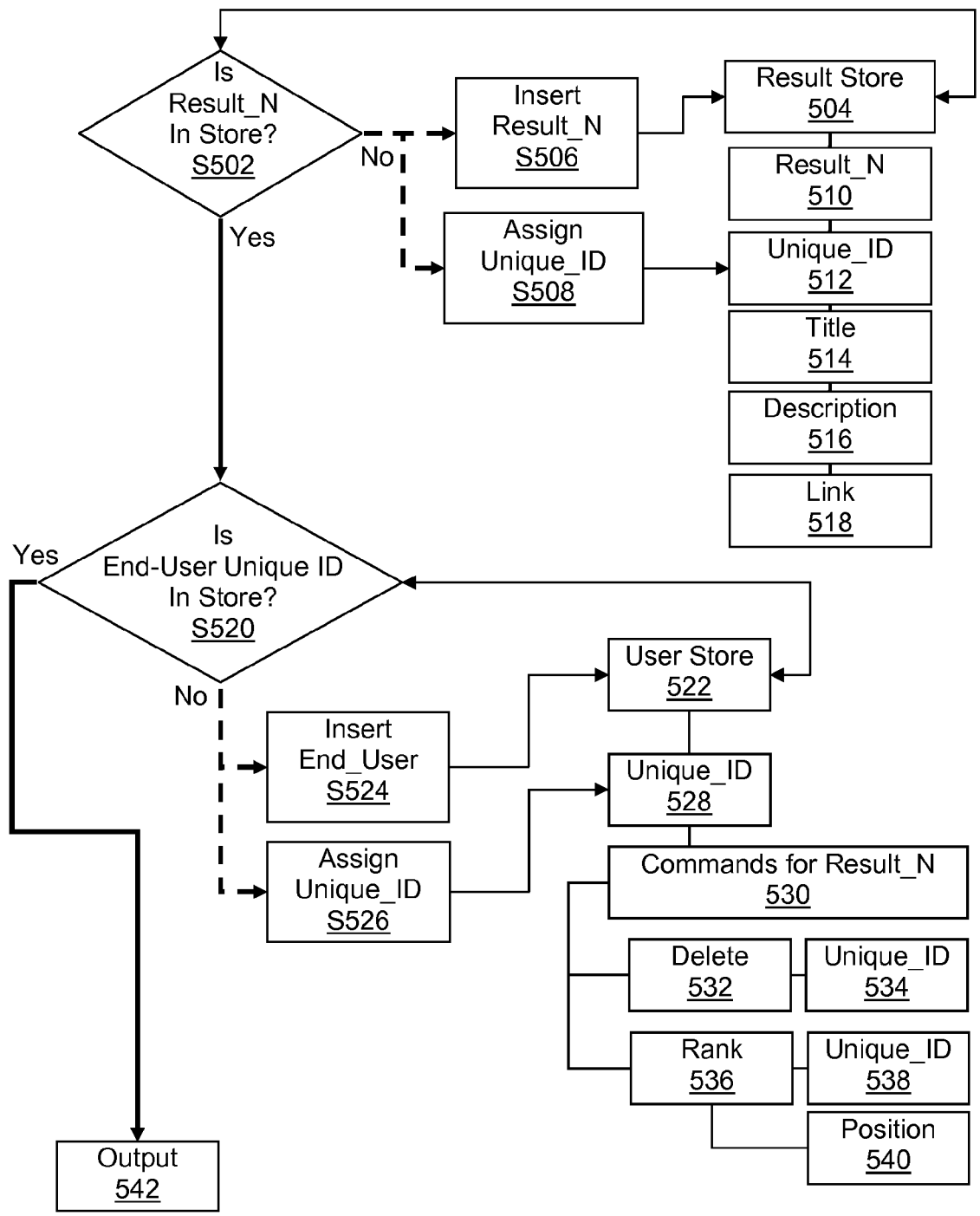
FIG. 5 illustrates an exemplary embodiment of the logic and steps of performing assignments for a particular result in iteration from FIG. 4 of the present invention.

FIG. 5 illustrates an exemplary embodiment of the logic and steps of performing assignments for a particular result in iteration. FIG. 5 depicts an embodiment of the present invention that serves a plurality of end-users and is a continuation of FIG. 4, corresponding to S410. While such assignment step is illustrated in FIG. 4 outside of the automatic result feeder, in other embodiments said assignment step could be performed in the automatic result feeder where part of the ROL is embedded in said feeder. The operations that can be performed by an embodiment of the present invention must first be sufficiently associated with the result that is the target of said operation. That is to say, the identity of the result is linked to the identified end-user command. "End-user command" in this description represents a generic operation selected by said end-user. Two end-user commands in this example are "delete" 532 and "rank" 536. The first evaluation step (S502) for assignments in the ROL is to determine whether result_N (510), a generic result in the result set, resides in the result store (504). In a preferred embodiment, the result store resides in a database management system (DBMS), although it can be single data structure or a plurality (list, array, etc.) of data structures. The present invention is not dependent on where the result store resides. In other words, the result store and user store can reside together or separate from one another, on either or both client and/or server. The result store (504) contains data pertaining to identified results and any attributes thereof. The particular result 510 illustrated in FIG. 5 include "unique_id" (512), "title" (514), "description" (516), and "link" (518). "Title" (514) is the title of the result. "Description" (516) is a brief description of the result that generally follows the "title." "Link" (518) is a universal resource locator (URL) to the location of the actual result on the Internet. These exemplary attributes are assigned to a particular result and are generally used to identify the result for a particular embodiment of the present invention. For example, 514, 516, and 518 are used to help establish the "uniqueness" of result 510 to create the identifier, "Unique_ID" (512). The first step S502 is the evaluation, "Is result_N in (result) store?" An exemplary evaluation may include searching the result store for a particular result having matched titles (514), links (518) and descriptions (516) with said result_N (510). If such a result exists in result store (504), then said result (510) with attributes 514, 516, 518, and including the unique identifier (512), will be assigned to the result and sent to the IRL as ROL output after iteration(s) is/are complete. The "Unique_ID" 512 of result_N 510 is utilized in the next step S520. If result_N 510 is not found in the result store (504), then said result is inserted in step S506 to reflect result_N 510 in the result store (504), and said result is assigned a "Unique_ID" 512 in step S508. S506 and S508 may be reversed in other embodiments of the present invention.

The ROL proceeds to step S520 in which the ROL determines if a particular end-user is located in user store (522). In a preferred embodiment, the user store resides in a database management system; although, it can represent a constant or single end-user data structure or a plurality (list, array, etc.) of end-users' data structures, or it can be assumed in a client-only embodiment. A user store (522) contains end-user data pertaining to a particular end-user and said end-user's interactions with particular results necessary to perform operations to reflect said interactions. Examples of end-user data include a particular end-user's "Unique_ID" (528) and a list of associated end-user data commands for result_N (530). Exemplary commands illustrated include "delete" (532) and the "Unique_ID" (534) of the result in which "delete" is directed, and "rank" (536), and the "Unique_ID" (538) of the result in which "rank" is directed and "position" (540), which is an attribute of "rank" (536) and the result to rank. In an embodiment, if a "Unique_ID" (528) is not assigned to said end-user, as in the case of a new query and/or unknown end-user, and is not is located in user store (522), the next step (S524) is to insert end-user and the end-user's associated command and attributes from a loopback feedback into the user store (522). Then, step S526 is to assign a unique identifier (528) to said end-user. In other embodiments of the present invention, S524 and S526 may be reversed. If end-user's unique_id 528 is located in user store (522), then the ROL utilizes the output (542), the data associating commands and attributes with result_N (530) for said end-user 528. For this example, result_N has two (2) end-user data commands: "delete" (532) and "rank" (536) with an attribute "position" (540). For exemplary purposes, "unique_id" 534 and "unique_id" 538 are the same as "unique_id" 512 from the result store (504). In other words, this exemplary embodiment associates all interactions for a particular result_N by a single "unique_id" and encapsulates such interactions in end-user data commands for a particular end-user (528). If there are no commands associated with a result, the result transparently passes through the system to the end-user by way of the IRL. In other words, the result will be displayed as originally generated by the result generator; however, said result will have a unique identifier to facilitate the IRL assigning said result to commands offered by a particular embodiment of the present invention. In other embodiments of the present invention, S520 and S502 may be reversed or altered.

Referring back to FIG. 2, it can further illustrate six commands by a particular end-user whose identity 206 is already assigned and is being provided to the ROL by loopback feedback from the IRL. The list of end-user commands 222 would be iterated through, and each command and attributes thereof would be stored in the user store. The commands 222 are pertaining to particular results in the result store having an identity to that of the values assigned in the Unique_ID attributes 226, 230, 234, 238, 244. Depending on the particular embodiment, what is stored and what is deleted from the user store when an end-user elects to delete a particular result, as in this example, can vary and would involve obvious optimization techniques to limit the size of the user store. The command rank 242 contains a Unique_ID attribute with the value of an identified result whose unique identity is assigned therein. The position 246, which was assigned by way of the prompt in the IRL, represents the position in which the result was elected by said end-user to be displayed. In an embodiment of the present invention, said result can be positioned in the display by the IRL before end-user data reflecting said rank command are provided to the ROL; however, the command must be stored in the user store as to be utilized in conjunction with other interactions and/or as to reflect subsequent queries by said end-user. So if a result whose identity matches that of an input identified result, the result can be positioned as elected in this example. While, in this example, all six (6) commands representing six (6) different interactions with a result set were received by the IRL during a loopback feedback, the preferred embodiment would typically include just one command or a plurality of related commands being received by the ROL stored and processed.

In FIG. 4 and FIG. 5, all results that are output from the automatic result feeder are given an identifier and stored in the result store; however, not all embodiments of the present invention will require each result item to be in result store. Identity can be provided real-time during an end-user interaction by way of loopback feedback from IRL to ROL such that said interaction can encapsulate data about a particular result and be added to the result store during a loopback feedback. In other words, a result is only identified once an end-user selects said result for an interaction. Employing this technique ensures that the result store is limited in size to reflect interactions performed by end-user or a plurality of end-users.

Figure 6:
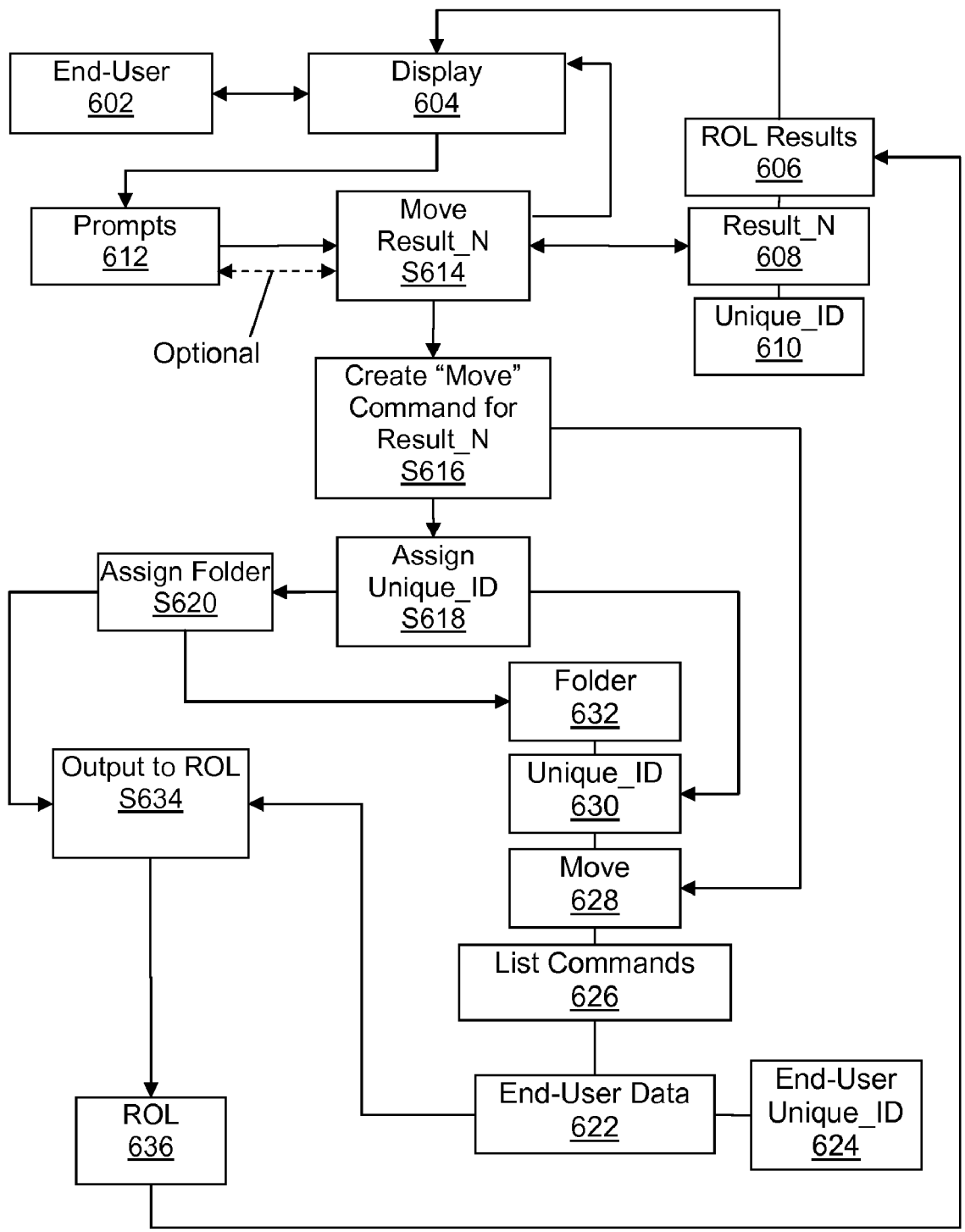
FIG. 6 illustrates the logic and steps of the interactive result layer (IRL) in an exemplary client/server embodiment of the present invention.

FIG. 6 illustrates, by way of example only, logic and steps of the interactive result layer (IRL) in a preferred client/server embodiment of the present invention, comprising of an end-user (602) interacting with ROL results (606) by way of a display (604). Exemplary prompts (612) include, but are not limited to, a menu of commands (FIG. 7), graphical object representations of commands (FIG. 8), or a dialog box, such as for requiring confirmation or prompting end-user (602) for input. End-user 602 selects an operation to perform on a result (608) from an array of operations (end-user commands) represented by the prompts (612) or prompt in the display (604). The first step S614 depicted in FIG. 6 is end-user 602 elects to "move" from the ROL Results (606) result_N (608) with a "Unique_ID" 610 to a generic, yet particular "Folder" (632). Optionally, the end-user can be prompted to confirm said command through a dialog box. For example, the dialog box may prompt, "Do you want to move Result_N to Folder? Yes or No." Once confirmed, the display is updated to reflect the move operation, which, in this case, removes said result from the display. The display can also change after the operation on the ROL result has been executed in the ROL and returned to the IRL since operations are performed in real-time and may cause more results or information about a particular result to be updated. After the end-user (602) selects the "move" command and assigns the result to a folder, the IRL proceeds to create a "Move" command (S616) by adding a command to end-user data (622) list of commands (626). The "Unique_ID" 624 corresponds to end-user 602. In step S618, the "Move" end-user data command (628) is assigned to "Unique_ID" 630 attribute with the value of the "Unique_ID" 610 of result_N (608). In other words, the value of "Unique_ID" 630 is set equal to the value of "Unique_ID" 610 so the "move" command identifier 628 is sufficiently associated with result_N. Next step S620, the IRL assigns the value of the "folder" attribute (632) input by end-user (602). The data structure for encapsulating end-user data (622) serves only as an example, and other methods can be employed for encapsulating end-user data in other embodiments of the present invention. In other words, a different method can employ a different order of assignment to end-user data (622) from the order given as illustration in FIG. 6. Finally in step S634, end-user data includes data created for the operation "Move Result_N" (622) and is sent to the ROL (636), where said interactive operation is stored. After said operation is processed by the ROL, additional results may be provided to the IRL as ROL results through the use of the real-time automatic result feeder. How ROL results are displayed in the IRL is dependant on the methods employed by a particular embodiment of the present invention. For a web application example, the user does not need to reload the page or re-issue said query in order for the interaction to be reflected in the display. A delete operation will result in the result being removed from the display and can be accomplished by means provided in the IRL. The IRL will receive updated results from the ROL, and the IRL will then update (synchronize) the display according to the results and end-user data provided by the ROL. Computer methods to perform a loopback feedback depend entirely on the computing environment embodied in the present invention. For a web application, for example only, AJAX techniques may be included to send and receive asynchronous end-user commands to and from the IRL and ROL and to receive ROL results from the ROL. For an exemplary client/server embodiment on a desktop, Jabber streams may be used as the transport mechanism whereby end-user data are provided in XML stanzas. For an exemplary client-only embodiment, methods described herein would suffice as providing such encapsulated data to such routines representing each layer is trivial.

Figure 7:
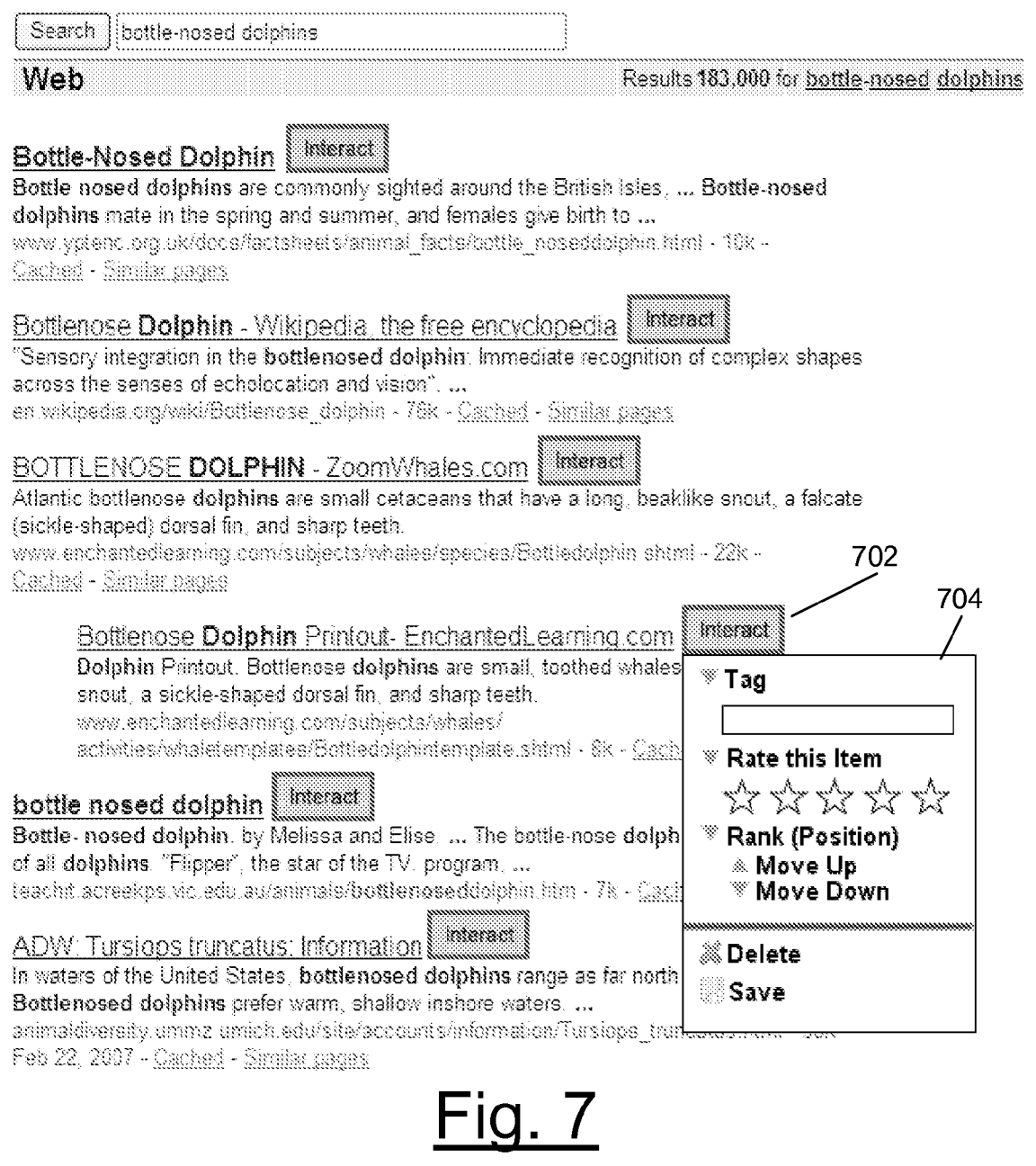

FIG. 7 illustrates an exemplary IRL prompt for an end-user aware internet search portal. FIG. 7 depicts each result for a query "bottle-nose dolphins" presented with a prompt, a click button to "interact" (702) with a particular result of said query. When the end-user clicks the "Interact" button (702), a menu (704) is displayed, prompting said end-user with the option to perform an array of commands and assignments. In this example, the menu (704) includes: "tag", "rate this item", "rank-move up", "rank-move down", "delete", and "save". The present invention creates end-user awareness in the system not just by allowing end-user interactions, but by allowing the end-user to control the structure of the results displayed to said end-user in real-time. "Rank-move up", "rank-move down", and "delete" change the structure of how the results are displayed to the end-user. Each individual result can be moved across the display or deleted. "Tag" and "rate this item" can change the structure of the display if the end-user is given an option to sort items according to the additional "tag" or the rating system or other commands that affect the structure in real-time. In an exemplary embodiment of the present invention for a web-based client, as depicted in FIG. 7., a real-time environment is created using AJAX; however, other real-time technologies, such as the Jabber protocol can be employed in other embodiments.

Figure 8:
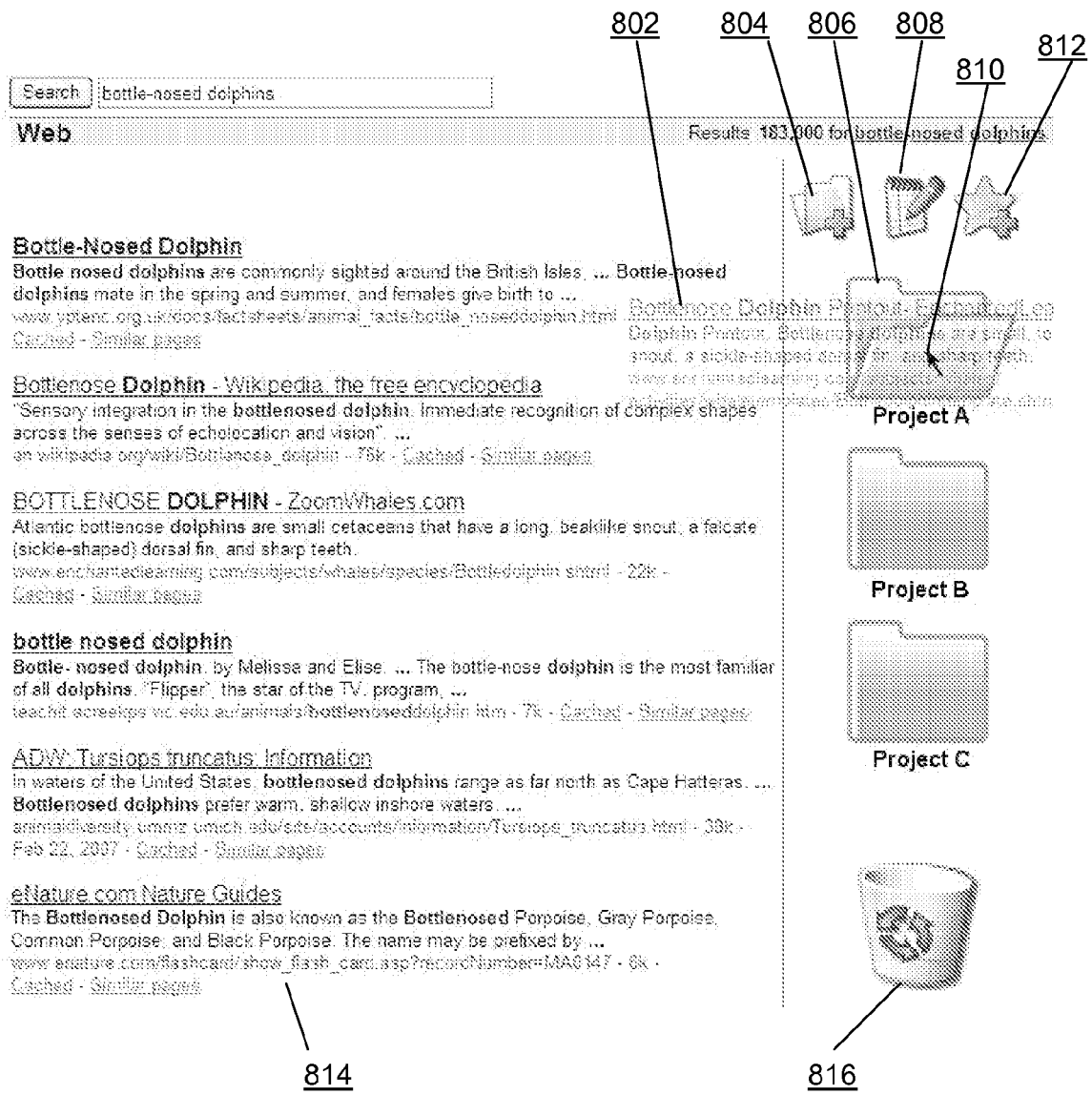
FIG. 8 illustrates another exemplary IRL prompt from FIG. 6.

FIG. 8 illustrates another exemplary IRL prompt for an end-user aware search portal to demonstrate the diversity of implementation for a prompt in the present invention to facilitate interaction between results and the end-user. FIG. 8 gives an example of prompts using objects to represent interactive commands and assignments. The same query is shown for FIG. 8 as in FIG. 7. Result 802 titled "Bottlenose Dolphin Printout- . . . " is being "dragged," represented by a "drag image", by the end-user to be "dropped" into the folder named "Project A" (806). The "drag image" 802 is moving by way of a computerized input device, illustrated by the curser graphic 810. Said "drag-and-drop" operation is an interaction by the end-user that includes the end-user command to "move" said result 802 to the assigned folder "Project A" (806). Additional options for commands and data assignments in the prompt illustrated in FIG. 8 include: creating new folders (804), assigning commentary (notes) to a result (808), add rating to result (812), and deleting a result (816). As result 802 is moved across the display, another result 814 is introduced to the display, which could not be seen before in FIG. 7.

FIG. 9 is a table of a simulated progression of a single query of the present invention by a particular end-user in an exemplary client/server embodiment. In FIG. 9, the display of the said end-user is set to view only ten (10) results per page (920). "R" is shorthand for "result". For the convention of this table, the first result displayed is labeled "R1", the second result displayed "R2", and so on. Initial query results, $QR_0$, in the first column 902 depict results that are generated by a generic result generator. Column 902 also shows how results for a typical system without the present invention are displayed even with "end-user interactions" enabled by current methods. The results in 902 do not reflect any end-user awareness. The present invention enables said end-user to interact with ROL results through the IRL to affect the structure of the results displayed, and the ROL performs the operations of said interaction and stores data necessary to create end-user awareness in the system. The results displayed to the end-user in the present invention are ROL results, ROL $R_0$ (906). 906 reflect prior interactions (904) that have occurred between the ROL results and said end-user. Prior interactions in column 904 include: delete R1, delete R2, delete R4, delete R6, and delete R8. The first result displayed in 906 is R3 compared to typical systems 902 that would display R1. Moreover, the present invention introduces five (5) more results to the display that would require typical systems to re-query. Present search system query results are generally streamed back to an end-user at a "page-per-page" basis. A query is sent when an end-user clicks for another page of results. Each page of results in a result set burdens the search system as a whole, such as having to cache results, and displaying a result set over laden with "noise." The present invention streams result sets as a set of individual results instead of as pages of results in a set yielding a real-time search experience not presently available.

Once the ROL results 906 are displayed to said end-user, then said end-user may interact with the results through said IRL. In this example, the interactions (908) said end-user selects are to delete R1, R12, R13, and R15 by multi-selecting said results. 908 demonstrate how multiple results can be associated with the same command. Optionally, an end-user may select multiple results and then the operation, in this case "delete". All four (4) commands are processed by the ROL to reflect said interactions. The end-user's display is updated without the end-user having to "refresh" the screen. Rather, the display is changed to reflect the deletion of R11, R12, R13, and R15, and R16, R17, R18, and R19 are introduced to the screen in real-time. In a web application client/server embodiment, AJAX may be utilized to stream end-user data from the IRL to the ROL and from the ROL to the IRL. XML can be utilized as a means for transporting ROL results and end-user data. JavaScript can be used to synchronize the ROL Results (in xml format) with the results in the display. These methods represent real-time implementations strategies for particular exemplary embodiments of the present invention; however, other methods to provide a real-time environment can be used in other embodiments.

In this example, column 912 depicts said end-user selecting to rank R17 to the first position of the page. In an embodiment of the present invention, this might be accomplished with a "drag-and-drop" of the result to the position. In another embodiment, R17 might be moved up the screen by clicking on an arrow associated with said result, which would take more interactions for it to move into the correct position. In both cases, the display can be changed in real-time to reflect the move the end-user is selecting, while the ROL processes the interaction and stores the position of R17 for future interactions. Column 914 shows the display of the ROL results after the IRL facilitated R17 to be moved to the first position of the display. Column 916 depicts said end-user selecting to "save" R18 to "Folder A". For this embodiment of the present invention, items "saved" are removed from the display; however, this is only an exemplary display implementation, and other embodiments of the present invention could include the "saved" items in the said display or the "saved" item displayed in another area of the display where the item is considered "saved". Column 918 shows the display after the "save" R18 to "Folder A" has been selected. R18 is removed from the display into "Folder A", which may or may not be displayed. R20 is introduced without a re-query to reflect the interaction. A typical web search system (902) will not be able to display Result 20 until the second query (end of second page). Through the present invention, the end-user is able to view and process more results, so that each search session becomes more efficient and effective. Through the level of end-user awareness in the present invention, results are catered to a particular end-user. In a preferred embodiment, permanent storage of end-user data enable end-users to benefit from past result interactions, providing a system with a greater end-user awareness of said past interactions. However, in another embodiment that does not require the end-user to login to the server, the present invention can be embodied to allow temporary storage of data to facilitate end-user awareness for the period of time the end-user is on the client. Such an example could utilize JavaScript and cookies to implement a user store.

Figure 10:
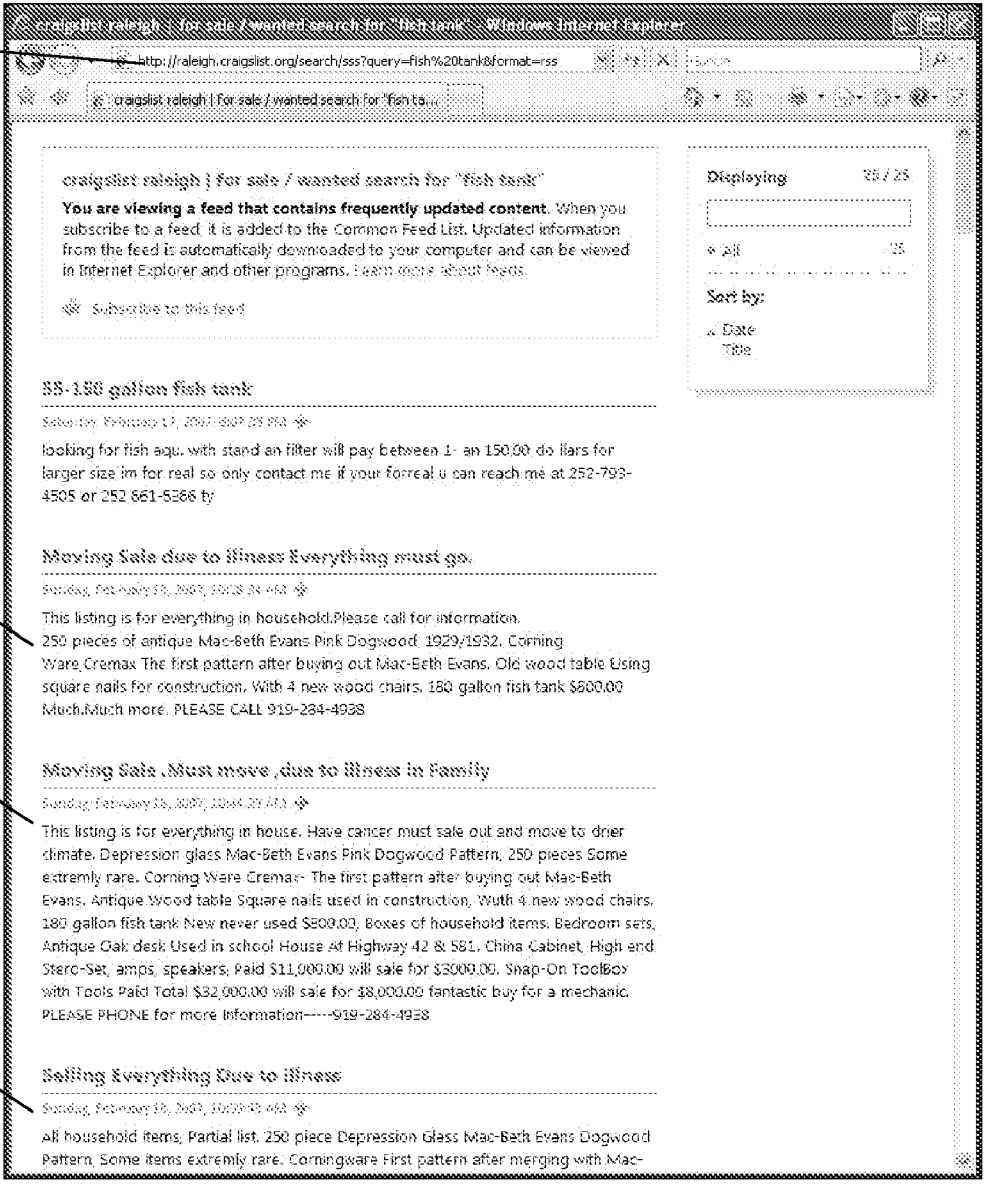
FIG. 10 is a screenshot of exemplary query results from a popular Internet classified listing service.

FIG. 10 is a screenshot of query results for an example search for "fish tank" on a popular Internet classified portal. A total of twenty-five (25) results were returned in the display; however, FIG. 10 depicts four (4) results within a standard view of a monitor. The results displayed for this portal site are not end-user aware, meaning results displayed on the site cannot be modified to suit a particular end-user outside of query operations. End-user interactions with the results are limited to sorting of results. The query 1002 is included in the URL and the results are output in XML, more specifically RSS. Result 1004, result 1006 and result 1004 are similar in content and reference the same contact phone number, yet in this system are three separate results. The end-user, in this example, cannot delete the redundant result. Results 1004, 1006, and 1008 are presented in FIG. 11 as results 1102, 1104, 1108 respectively and FIG. 12 presents result 1004 as result 1204.

FIG. 11 and FIG. 12 are screenshots of an exemplary client-only embodiment of the present invention. All aspects of the present invention (ROL, IRL, result store, user store) are locally embodied on the client and the loopback feedback is performed in accordance of the present invention. This example assumes only one end-user has access to the client, therefore, the result store is superimposed on the user store. In other words, there is only one data structure assuming the role for both the result store and user store. However, other client-only embodiments may utilize separate logins for multiple users. Said client has received the same results to the same query as in FIG. 10 "fish tank" from the same result generator as the Internet classified portal site by way of the same URL. The returned results for FIG. 11 are identical to the results from FIG. 10. Result 1102 depicted in FIG. 11 is also present in FIG. 10 as result 1004. Result 1104 is deleted from the ROL results as by way of the IRL prompt (1106) and is not displayed in FIG. 12, a screenshot of the ROL results from the said query after the end-user has elected to perform various operations on some of the ROL results from FIG. 12. Prompt 1106, by way of example, is a presentation of a plurality of operations to perform on a particular result in the ROL result set. ("Refresh" in this embodiment is to re-query the system to check for new results.) Another prompt, a "delete" button, is displayed along side each ROL result as to facilitate an end-user to delete a result from the ROL results. FIG. 12 further illustrates how through the elimination of "noise" associated with a query, an end-user is able to view more results in the display area without having to generate another query (by clicking to another page) or scroll down a page. Result 1202 has been ranked up to the highest position and was previously unseen in the list of results (FIG. 11). A benefit of a client-only embodiment is that a result generator need not provide any parts to the present invention. That is to say, a result generator need only provide results as input to the present invention and need not be aware of present invention. Moreover, through a preferred client-only embodiment of the present invention, an end-user does not need to login to a server to gain the utility of an end-user aware search by way of the encapsulation of end-user data by methods described herein.

More generally, the above illustrative examples disclose a method to facilitate end-user awareness to optimize and refine results for said end-user for current and/or subsequent queries.

The above described embodiments are intended to be illustrative only and in no way limiting. The described embodiments of carrying out the invention are susceptible to many modifications of form, arrangement of parts, details, or order of operation. Rather, the invention is intended to encompass all such modifications, within its scope, as defined by the claims.

The invention claimed is:

1. A search system to provide and display real-time interaction with end-user aware query results utilizing a layered approach comprising:

(A) at least one search engine or at least one database or combination thereof providing results in response to end-user query, herein referred to as "result generator";

(B) Interactive Result Layer (IRL) that comprises:
 (i) a display device that presents query results and Result Operational Layer (ROL) results or only ROL results;
 (ii) means to accept and present ROL results from step (C)(ii)(h) in real-time;
 (iii) User Interface (UI) means to prompt for at least deletion or deletion and plurality of interactive operations for particular displayed result or any attribute thereof;
 (iv) input device with means to facilitate end-user interactivity with said particular displayed result or said any attribute thereof;
 (v) means to encapsulate each end-user interactive operation and associate corresponding predefined static operation identifier with unique identifier of particular result and with unique identifier of particular end-user, herein referred to as "End-User Data" to enable conversion of query results into ROL results in ROL (C)(ii);
 (vi) means to accept and output End-User Data as real-time stream for loopback feedback (D);
 (vii) means to synchronize display of at least one ROL result on said display device to perform omission, addition, relational or absolute position change, spatial coordinate change or visibility change of said particular displayed result or alteration of attribute or addendum to attribute of said particular displayed result in order to reflect said end-user interactivity with said particular displayed result in real-time using said End-User Data;

(C) Result Operational Layer (ROL) that comprises:
 (i) at least one database to store and to retrieve unique identifier of ROL said particular displayed result and at least one attribute of particular displayed result, herein referred to as "ROL result data," and End-User Data, wherein said ROL result data and said End-User Data are utilized in current and subsequent queries or persistent queries or combination thereof;
 (ii) at least one processor to automatically convert query results into ROL results in real-time comprising steps to:
  (a) obtain and organize, query results from said result generator;
  (b) uniquely identify each query result using at least one attribute from said result to utilize in steps (d), (e), and (f);
  (c) obtain unique identifier of end-user for steps (e) and (f);
  (d) iterate said query results and set particular query result in iteration for building list of commands in step (f);
  (e) obtain and organize ROL result data and End-User Data for building list of commands step (f);
  (f) build list of commands by aggregating said End-User Data, said unique identifier of said ROL result, said unique identifier of said end-user, at least one attribute of said query result in iteration, and said ROL result data;
  (g) process said list of commands by iterating said list of commands and set particular command in iteration, evaluate predefined static operation identifier of said command in iteration to perform interactive operation, and perform said interactive operation based on said operation identifier of said particular command in iteration that represents omission, addition, relational or absolute position change, spatial coordinate change, visibility change, alteration of attribute, or addendum to attribute of said query result in iteration;
  (h) provide output, herein referred to as "ROL result", to IRL;
 wherein said steps to automatically convert query results into ROL results to reflect end-user real-time interactivity with displayed results is accomplished without having to save, delete, or modify actual said query results from result generator;

(D) real-time loopback feedback that facilitates bi-directional end-user data transfer between IRL and ROL in at least one computing device;

wherein real-time end-user awareness in the display of ROL results is accomplished independent of query through loopback feedback performed between IRL and ROL.

2. The search system of claim 1, wherein IRL synchronization (2)(B)(vii) and ROL conversion step (23)(C)(ii) are dependent on an automatic result feeder (ARF), said ARF comprises: a flow control that controls the flow of query results as input to Result Operational Layer (23)(C)(ii)(a); ensures a complete and exhaustive feed of query results from at least one result generator; and ensures continuance of fixed number of results on display device; and comprises steps to:

(A) assemble an exhaustive list or lists of query results, herein referred to as "ARF list", for a particular search term made by particular end user from at least one search engine or database;

(B) Accept request for at least one additional query result by ROL when either:
 (i) ROL processing of list of commands step (23)(C)(ii)(g) anticipates or encounters an omission, relational or absolute position change, spatial coordinate change, or visibility change of ROL result requiring at least one additional query result to be processed for displaying; or,
 (iii) IRL synchronization step (23)(B)(vii) anticipates or encounters an omission, relational or absolute position change, spatial coordinate change, or visibility change of ROL result requiring at least one additional query result to be processed for displaying;

(C) transverse said ARF list to provide response by utilizing at least one loop control variable as a means to throttle amount of said query results fed as output to ROL input step (23)(C)(ii)(a);

(D) evaluate completion of request based on loop control variable and total number of said query results in said ARF list;

(E) store and retrieve value of said loop control variable to enable utilization of said value in current, subsequent, persistent query or combination thereof;

(F) provide query result or query results as output to ROL; wherein providing display device automatically with real-time continuance of exhaustive results is accomplished without having to re-query or go to different subset of results by steps herein.

3. The search system of claim 1, wherein real-time loopback feedback that facilitates bi-directional end-user data transfer between IRL and ROL in at least one computing device, said computing device is at least one server dedicated to search comprising ROL connected to network; at least one computing device that is a computer client comprising IRL connected to said server through said network; and, loopback feedback between said IRL and said ROL utilizing said network.

4. The search system of claim 1, wherein real-time loopback feedback that facilitates bi-directional end-user data transfer between IRL and ROL in at least one computing device, said computing device is a server dedicated to search, comprising at least one network interface device to provide at least one client computing device IRL (23)(B)(ii), (23(B)(iii), (23)(B)(v), (23)(B)(vi), and (23)(B)(vii).

5. The search system of claim 2, wherein IRL and ROL are dependent on an automatic result feeder, said IRL and said ROL reside on a client-only device further comprising network interface connected to at least one search engine or at least one database or combination thereof.

6. A client-only device of the search system of claim 5, said client-only device is a mobile computing device.

* * * * *